United States Patent
Teska et al.

(10) Patent No.: US 11,806,978 B2
(45) Date of Patent: Nov. 7, 2023

(54) HYBRID SIDE RAIL ASSEMBLIES AND MATTRESSES INCLUDING THE SAME

(71) Applicant: DREAMWELL, LTD., Doraville, GA (US)

(72) Inventors: Joseph Teska, Doraville, GA (US); Kent Mahlke, Doraville, GA (US); Richard F. Gladney, Fairburn, GA (US); Victor Ray Prince, Doraville, GA (US); Robert Hellyer, Doraville, GA (US); Jeremy Brodioi, Doraville, GA (US)

(73) Assignee: DREAMWELL, LTD., Doraville, GA (US)

( * ) Notice: Subject to any disclaimer, the term of this patent is extended or adjusted under 35 U.S.C. 154(b) by 0 days.

(21) Appl. No.: 17/388,546

(22) Filed: Jul. 29, 2021

(65) Prior Publication Data
US 2022/0395105 A1    Dec. 15, 2022

Related U.S. Application Data

(60) Provisional application No. 63/208,803, filed on Jun. 9, 2021.

(51) Int. Cl.
*A47C 27/06* (2006.01)
*A47C 27/22* (2006.01)
(Continued)

(52) U.S. Cl.
CPC ............ *B32B 5/245* (2013.01); *A47C 27/056* (2013.01); *A47C 27/121* (2013.01); *A47C 27/122* (2013.01); *A47C 27/148* (2013.01); *A47C 27/15* (2013.01); *A47C 27/20* (2013.01); *A47C 27/22* (2013.01); *B32B 5/022* (2013.01); *B32B 5/18* (2013.01); *B32B 7/02* (2013.01);
(Continued)

(58) Field of Classification Search
None
See application file for complete search history.

(56) References Cited

U.S. PATENT DOCUMENTS 2,826,769 A * 3/1958 Gustav ................. A47C 27/066
5/717
3,618,146 A * 11/1971 Ferdinand ............ A47C 27/066
5/717
(Continued)

FOREIGN PATENT DOCUMENTS

AU      9941080 A  *  1/2001
CN    204169491 U  *  2/2015
(Continued)

OTHER PUBLICATIONS

Machine Translation of CH-477847-A, Sep. 1969 (Year: 1969).*
(Continued)

*Primary Examiner* — Jeffrey A Vonch
(74) *Attorney, Agent, or Firm* — CANTOR COLBURN LLP (57) ABSTRACT

A side rail assembly and a mattress assembly including the side rail assembly about at least a portion of a perimeter of the mattress assembly. The side rail assembly includes a laminate structure including one or more foam layers and one or more fiber layers in a stacked arrangement. The fiber layer can be a non-woven layer.

20 Claims, 4 Drawing Sheets

(51) Int. Cl.
  *B32B 5/02* (2006.01)
  *B32B 5/18* (2006.01)
  *B32B 5/24* (2006.01)
  *B32B 7/02* (2019.01)
  *A47C 27/14* (2006.01)
  *A47C 27/20* (2006.01)
  *A47C 27/15* (2006.01)
  *A47C 27/12* (2006.01)
  *A47C 27/05* (2006.01)
  *B32B 7/022* (2019.01)
  *B32B 3/02* (2006.01)
  *B32B 3/26* (2006.01)

(52) U.S. Cl.
  CPC ............ *B32B 7/022* (2019.01); *A47C 27/05* (2013.01); *A47C 27/053* (2013.01); *A47C 27/066* (2013.01); *A47C 27/12* (2013.01); *A47C 27/14* (2013.01); *B32B 3/02* (2013.01); *B32B 3/266* (2013.01); *B32B 2250/02* (2013.01); *B32B 2250/03* (2013.01); *B32B 2250/24* (2013.01); *B32B 2250/40* (2013.01); *B32B 2262/0207* (2013.01); *B32B 2262/0276* (2013.01); *B32B 2262/144* (2021.05); *B32B 2266/0278* (2013.01); *B32B 2266/06* (2013.01); *B32B 2305/022* (2013.01); *B32B 2305/026* (2013.01); *B32B 2305/28* (2013.01); *B32B 2307/50* (2013.01); *B32B 2307/51* (2013.01); *B32B 2307/536* (2013.01); *B32B 2307/54* (2013.01); *B32B 2307/72* (2013.01); *B32B 2307/724* (2013.01); *B32B 2307/737* (2023.05); *B32B 2307/7375* (2023.05); *B32B 2307/7376* (2023.05); *B32B 2479/00* (2013.01); *Y10T 428/2495* (2015.01); *Y10T 428/24322* (2015.01); *Y10T 428/24744* (2015.01); *Y10T 428/24777* (2015.01); *Y10T 428/24983* (2015.01); *Y10T 428/24992* (2015.01); *Y10T 428/249962* (2015.01); *Y10T 428/249964* (2015.04); *Y10T 428/249981* (2015.04); *Y10T 442/647* (2015.04); *Y10T 442/649* (2015.04); *Y10T 442/651* (2015.04)

(56) References Cited

U.S. PATENT DOCUMENTS

| | | | | |
|---|---|---|---|---|
| 3,848,283 A * | 11/1974 | Ikeda | A47C 27/066 | 5/717 |
| 4,086,675 A * | 5/1978 | Talbert | A47C 27/15 | 5/655.9 |
| 4,187,566 A * | 2/1980 | Peterson | A47C 27/085 | 5/915 |
| 4,189,797 A * | 2/1980 | Glackin | A47C 27/15 | 5/690 |
| 4,224,706 A * | 9/1980 | Young | A47C 23/047 | 5/710 |
| 4,991,244 A * | 2/1991 | Walker | A47C 27/082 | 5/713 |
| 5,065,485 A * | 11/1991 | Zocco | A47C 31/105 | 29/525.04 |
| 5,138,730 A * | 8/1992 | Masuda | A47C 27/15 | 5/736 |
| 5,353,455 A * | 10/1994 | Loving | A47C 23/002 | 29/451 |
| 5,513,402 A * | 5/1996 | Schwartz | A47C 27/16 | 5/691 |
| 5,537,699 A * | 7/1996 | Bonaddio | A47C 27/063 | 5/717 |
| 5,701,623 A * | 12/1997 | May | A47C 27/15 | 5/727 |
| 5,724,686 A * | 3/1998 | Neal | A47C 27/066 | 5/717 |
| 5,937,464 A * | 8/1999 | Niederman | A47C 27/20 | 5/718 |
| 5,960,496 A * | 10/1999 | Boyd | A47C 27/18 | 5/931 |
| 6,317,912 B1 * | 11/2001 | Graebe | A47C 23/047 | 5/655.8 |
| 6,601,253 B1 * | 8/2003 | Tarquinio | A47D 15/008 | 5/727 |
| 6,782,575 B1 * | 8/2004 | Robinson | A47C 27/15 | 5/736 |
| 6,804,848 B1 * | 10/2004 | Rose | A47C 27/18 | 5/710 |
| 7,640,611 B1 * | 1/2010 | Kluft | A47C 27/064 | 5/718 |
| 8,266,747 B1 * | 9/2012 | Sobran | A47C 27/003 | 5/678 |
| 9,131,782 B1 * | 9/2015 | Baker | A47C 27/001 | |
| 10,485,357 B1 * | 11/2019 | Limer | A47C 27/144 | |
| 2002/0166175 A1 * | 11/2002 | An | A47C 27/056 | 5/717 |
| 2003/0000021 A1 * | 1/2003 | O'Connell | A47C 27/002 | 5/739 |
| 2003/0019043 A1 * | 1/2003 | Bryant | A47C 23/0522 | 5/719 |
| 2003/0135930 A1 * | 7/2003 | Varese | A47C 27/148 | 5/722 |
| 2003/0177584 A1 * | 9/2003 | Boyd | A47C 27/148 | 5/727 |
| 2003/0177585 A1 * | 9/2003 | Gladney | A47C 27/14 | 5/717 |
| 2004/0163180 A1 * | 8/2004 | Bryant | A47C 27/15 | 5/691 |
| 2004/0222685 A1 * | 11/2004 | Steagall | A47C 27/22 | 297/452.48 |
| 2004/0237204 A1 * | 12/2004 | Antinori | A47C 23/0522 | 5/717 |
| 2005/0000026 A1 * | 1/2005 | Gladney | A47C 19/021 | 5/717 |
| 2005/0039264 A1 * | 2/2005 | Barman | A47C 27/146 | 5/717 |
| 2005/0081301 A1 * | 4/2005 | Watson | A47C 27/00 | 5/739 |
| 2005/0188467 A1 * | 9/2005 | Woolfson | A47C 27/148 | 5/724 |
| 2006/0031995 A1 * | 2/2006 | Barkhouse | A47C 27/20 | 5/722 |
| 2006/0260062 A1 * | 11/2006 | Barman | A47C 27/053 | 5/717 |
| 2007/0044244 A1 * | 3/2007 | Ahn | B68G 7/054 | 5/717 |
| 2007/0283668 A1 * | 12/2007 | Oh | A47C 19/021 | 29/91 |
| 2008/0295251 A1 * | 12/2008 | Flippin | A47C 27/053 | 29/428 |
| 2009/0031502 A1 * | 2/2009 | Berrcocal | A47C 27/05 | 411/500 |
| 2009/0038080 A1 * | 2/2009 | Grigg | A47C 27/05 | 5/738 |
| 2009/0100606 A1 * | 4/2009 | An | A47C 27/15 | 5/690 |
| 2009/0158528 A1 * | 6/2009 | Frey | A47C 27/15 | 5/722 |
| 2011/0099722 A1 * | 5/2011 | Moret | A47C 27/148 | 5/701 |
| 2012/0180224 A1 * | 7/2012 | DeMoss | A47C 27/053 | 5/717 |
| 2012/0246833 A1 * | 10/2012 | Kluft | A47C 27/20 | 5/717 |
| 2013/0000046 A1 * | 1/2013 | Murphy | G09F 23/00 | 5/691 |
| 2013/0025065 A1 * | 1/2013 | Chunglo | A47C 27/144 | 5/691 |
| 2013/0025068 A1 * | 1/2013 | Chunglo | A47C 27/14 | 5/739 |

(56) References Cited

U.S. PATENT DOCUMENTS

| | | | | |
|---|---|---|---|---|
| 2013/0025069 A1* | 1/2013 | Ruehlmann | ............ | A47C 21/046 5/740 |
| 2013/0025070 A1* | 1/2013 | Ruehlmann | ............ | A47C 27/15 5/740 |
| 2013/0174344 A1* | 7/2013 | Klancnik | ............ | A47C 27/15 428/221 |
| 2013/0174350 A1* | 7/2013 | Allman | ............ | A47C 27/144 156/60 |
| 2013/0263380 A1* | 10/2013 | Young | ............ | A47C 23/04 5/719 |
| 2013/0283538 A1* | 10/2013 | Young | ............ | A47C 27/20 5/724 |
| 2013/0291312 A1* | 11/2013 | Bell, Jr. | ............ | A47C 27/15 5/739 |
| 2014/0090178 A1* | 4/2014 | Morgan | ............ | A47C 27/15 5/740 |
| 2014/0165292 A1* | 6/2014 | Gladney | ............ | A47C 27/05 5/717 |
| 2014/0317856 A1* | 10/2014 | Allman | ............ | A47C 27/065 5/724 |
| 2014/0373281 A1* | 12/2014 | Mossbeck | ............ | A47C 27/053 5/718 |
| 2015/0096127 A1* | 4/2015 | Schiller | ............ | A47C 27/15 5/717 |
| 2016/0081488 A1* | 3/2016 | Zhang | ............ | A47C 27/056 5/702 |
| 2019/0090651 A1* | 3/2019 | Gargalis | ............ | A47C 27/148 |
| 2019/0298076 A1* | 10/2019 | Lim | ............ | A47C 27/053 |
| 2021/0251393 A1* | 8/2021 | Harris | ............ | A47C 27/10 |
| 2022/0047090 A1* | 2/2022 | Lim | ............ | A47C 21/046 |

FOREIGN PATENT DOCUMENTS

| | | | | |
|---|---|---|---|---|
| CN | 204245698 U | * | 4/2015 | |
| CN | 105380452 A | * | 3/2016 | |
| DE | 202008004502 U1 | * | 10/2008 | ............ A47C 27/001 |
| DE | 202013101151 U1 | * | 5/2013 | ............ A47C 27/148 |
| FR | 2730914 A3 | * | 8/1996 | ............ A47C 27/001 |
| JP | 06133834 A | * | 5/1994 | |
| JP | 07023834 A | * | 1/1995 | |
| JP | 3008437 U | * | 3/1995 | |
| JP | 11244098 A | * | 9/1999 | |
| JP | 2002223901 A | * | 8/2002 | |
| JP | 2002253390 A | * | 9/2002 | |
| JP | 2005098348 A | * | 4/2005 | |
| JP | 2013230189 A | * | 11/2013 | |
| KR | 2007102873 A | * | 10/2007 | |
| KR | 101454221 B1 | * | 10/2014 | ............ A47C 27/15 |
| NL | 1037080 C2 | * | 12/2010 | ............ A47C 21/046 |
| RU | 190839 U1 | * | 7/2019 | ............ A47C 27/15 |
| WO | WO-2010090199 A1 | * | 8/2010 | ............ A47C 27/15 |
| WO | WO-2017178998 A1 | * | 10/2017 | ............ A47C 27/144 |
| WO | WO-2019209363 A1 | * | 10/2019 | ............ A47C 27/001 |
| WO | WO-2020025172 A1 | * | 2/2020 | |

OTHER PUBLICATIONS

Machine Translation of JP-07023834-A, Jan. 1995 (Year: 1995).*
Machine Translation of JP-3008437-U, Mar. 1995 (Year: 1995).*
Machine Translation of JP-2002223901-A, Aug. 2002 (Year: 2002).*
Machine Translation of KR-101454221-B1, Oct. 2014 (Year: 2014).*
Machine Translation of RU-190839-U1, Jul. 2019 (Year: 2019).*
Machine Translation of NL-1037080-02, Dec. 2010 (Year: 2010).*

* cited by examiner

HYBRID SIDE RAIL ASSEMBLIES AND MATTRESSES INCLUDING THE SAME

CROSS REFERENCE TO RELATED APPLICATIONS

The present application claims the benefit of U.S. Provisional Application No. 63/208,904 filed on Jun. 9, 2021, and incorporated herein in its entirety.

BACKGROUND

The present disclosure generally relates to hybrid side rail assemblies and mattress assemblies including the same, and more particularly, to hybrid side rail assemblies including a laminate structure of one or more foam layers and one or more fiber layers within the laminate structure.

Current side rail assemblies used in the mattress assemblies are configured to provide edge support about one or more perimeters of the mattress assembly so as to prevent roll off when an occupant is at or proximate to an edge of the mattress. Typical side rail assemblies are formed of foam or a combination of foam and coils.

BRIEF SUMMARY

Disclosed herein are hybrid side rail assemblies and mattress assemblies including the same. In one embodiment, a mattress assembly includes an inner core; and a side rail assembly disposed about at least a portion of a perimeter of the inner core, wherein the side rail assembly includes a laminate structure of one or more foam layers and one or more fiber layers within the laminate structure in a stacked arrangement.

In another embodiment, a side rail assembly for supporting an edge of a mattress includes a laminate structure of one or more foam layers and one or more fiber layers within the laminate structure in a stacked arrangement.

The disclosure may be understood more readily by reference to the following detailed description of the various features of the disclosure and the examples included therein.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Disclosed herein are hybrid side rail assemblies and mattress assemblies including the hybrid side rail assemblies, which provide edge support about a mattress inner core as well as user comfort. The hybrid side rail assemblies generally include a laminate structure of one or more foam layers and one or more fiber layers within the laminate structure. As will be described in greater detail herein, the hybrid side rail assemblies are provided about at least a portion of a perimeter of a mattress inner core to generally define the mattress assembly. In one or more embodiments, the hybrid side rail assemblies are peripherally disposed about each side of the mattress inner core. In one or more other embodiments, the hybrid side rail assemblies are peripherally disposed about each side and a foot end of the mattress inner core, and in still one or more embodiments, the hybrid side rail assembly is peripherally disposed about each side, a head end and a foot end of the mattress inner core. Generally, each of the hybrid side rail assemblies generally has a parallelpiped shaped including planar top and bottom surfaces and a sidewall extending from the bottom surface to the top surface. Depending on the configuration, the hybrid rail assemblies can be attached to another side rail assembly at a terminal end to form the desired peripheral edge support for the intended mattress assembly. The ends may be configured to interlock with one another with or without an adhesive. The attachment to other side rail assemblies is not intended to be limited as well as to the inner core can include the use of an adhesive and/or a mechanical fastener. As is generally known in the art, the mattress inner core is not intended to be limited and can be defined by one or more layers of foam, spring coils, fiber layers, air bladders, and combinations thereof.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Figure 1:
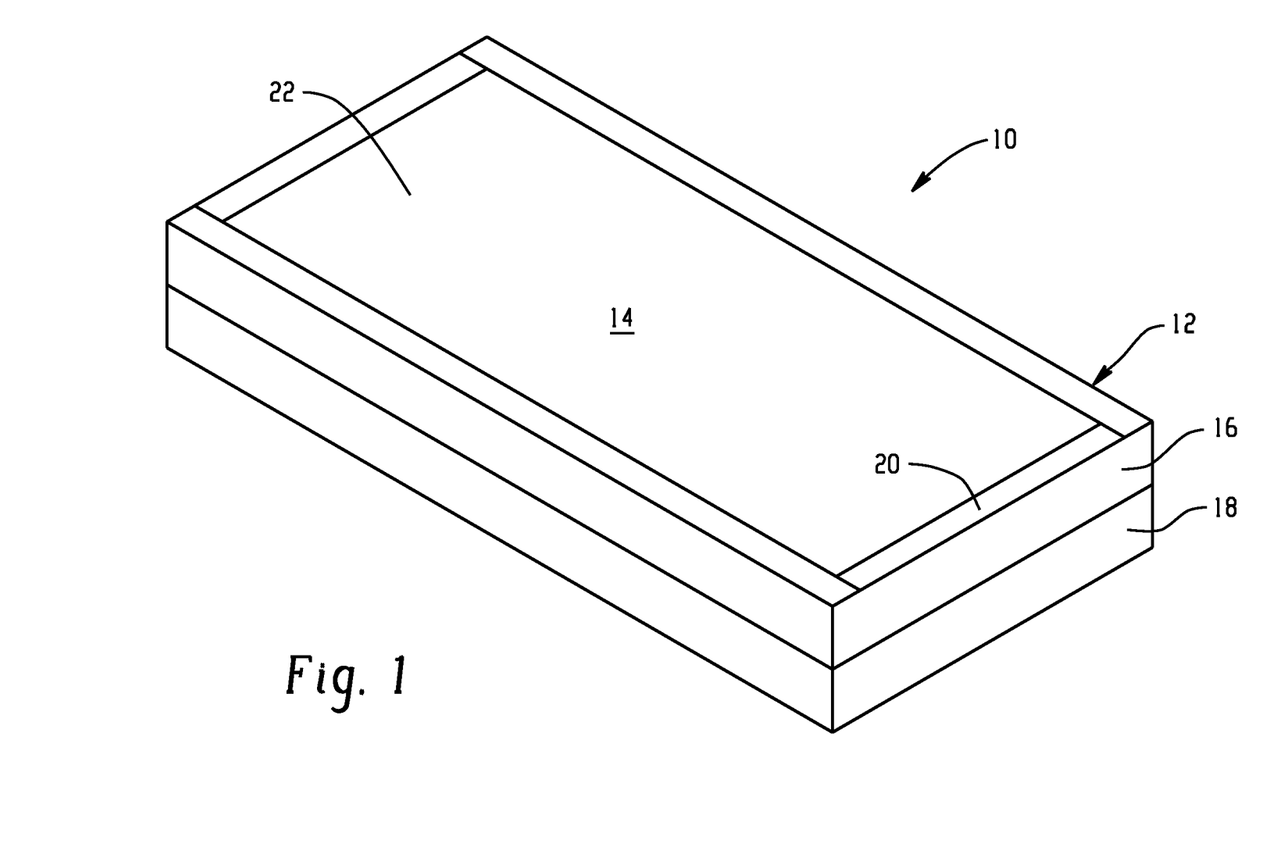
FIG. 1 illustrates a perspective view of a mattress assembly including a hybrid side rail assembly in accordance with an embodiment of the present disclosure.

Turning now to FIG. 1, there is shown a perspective view of an exemplary mattress assembly 10 including a hybrid side rail assembly 12 about an entire periphery of an inner core 14. The hybrid side rail assembly 12 is a laminate structure including one or more foam layers 16 and one or more fiber layers 18 within the laminate structure. As shown in FIG. 1, the illustrated hybrid side rail assembly 12 includes a single foam layer 16 laminated to a single underlying fiber layer 18. In one or more embodiments, the foam layer 16 is selected to be an uppermost layer in the rail assembly 12 as shown such that a top planar surface 20 of the hybrid side rail assembly is foam. The top planar surface 20 of the foam layer can be coplanar to a planar surface 22 provided by the inner core 14. However, it should be apparent to those skilled in the art that the mattress assembly 10 can include one or more additional layers (not shown), which can overlap the top planar surfaces of the inner core or both the inner core 14 and the side rail assembly 12. In other embodiments, the fiber layer 18 is selected to be the uppermost layer.

In one or more embodiments, the foam layer or foam layers included in the side rail assembly constitutes at least about 10 percent of the height dimension of the side rail assembly. In one or more other embodiments, the foam layer or foam layers constitutes greater than about 25 percent of the height dimension of the side rail assembly, and in still one or more embodiments, the foam layer or foam layers constitutes greater than about 50 percent of the height dimension of the side rail assembly.

The foam in the one or more foam layers 16 is not intended to be limited and can include polyurethane foams, latex foams including natural, blended and synthetic latex foams; polystyrene foams, polyethylene foams, polypropylene foam, polyether-polyurethane foams, and the like. Likewise, the foam layer 16 can be selected to be formed from viscoelastic or non-viscoelastic foams. Some viscoelastic materials are also temperature sensitive, thereby also enabling the foam layer to change hardness/firmness based in part upon the temperature of the supported part. Unless otherwise noted, any of these foams may be open cell or closed cell or a hybrid structure of open cell and closed cell. Likewise, the foams can be reticulated, partially reticulated or non-reticulated foams. The term reticulation generally refers to removal of cell membranes to create an open cell structure that is open to air and moisture flow. Still further, the foams may be gel infused in some embodiments. In some embodiments, the foam layer can include one or more channels (not shown) for improved air flow. In the one or more embodiments including more than one foam layer, each of the multiple foam layers can be formed of the same material configured with different properties or can be formed of different materials.

The various foams suitable for use in the foam layer may be produced according to methods known to persons ordinarily skilled in the art. For example, polyurethane foams are typically prepared by reacting a polyol with a polyisocyanate in the presence of a catalyst, a blowing agent, one or more foam stabilizers or surfactants and other foaming aids. The gas generated during polymerization causes foaming of the reaction mixture to form a cellular or foam structure. Latex foams are typically manufactured by the well-known Dunlap or Talalay processes. Manufacturing of the different foams are well within the skill of those in the art.

The different properties for each foam layer may include, but are not limited to, density, hardness, thickness, support factor, flex fatigue, air flow, various combinations thereof, and the like. Density is a measurement of the mass per unit volume and is commonly expressed in pounds per cubic foot. Density can be and is measured in accordance with ASTM D-3574. The hardness properties of foam are also referred to as the indention load deflection (ILD) or indention force deflection (IFD) and is also measured in accordance with ASTM D-3574. In the case of multiple foam layers, the density and hardness properties can be varied or the same. Moreover, combinations of properties may be varied for each individual layer. The individual foam layers can also be of the same thickness or may have different thicknesses as may be desired to provide different tactile responses.

In one or more embodiments, the hardness property of the foam layers generally have an ILD within a range of about 35 to about 100 pounds-force. In other embodiments, the hardness property of the foam layers can have an ILD of about 40 to about 90 pounds-force; and in still other embodiments, the hardness property of the foam layers can have an ILD of about 50 to about 75 pounds-force. In one or more embodiments, the density of the foam layers can generally range from about 1 to about 3 pounds per cubic foot (pcf). In other embodiments, the density of the foam layers can range from about 1.2 to about 2 pcf.

The fiber layer generally includes a plurality of fibers formed into a coherent shape suitable for use in the side rail assembly. The plurality of fibers can be mechanically and/or thermally bonded to one another to form the cohesive shape as is generally known in the art. In this regard, the fibers are not intended to be limited to any particular fiber type. The fiber layer can be formed of a single type of fiber or a blend of more than one fiber type, can be formed of fibers having the same or different lengths, can be formed of fibers having similar or different, can be formed of fibers having similar diameters or different diameters, and the like.

In one or more embodiments, the fiber layer can be formed from a composition including staple fibers and binder fibers. Suitable staple fibers include, without limitation, a synthetic polymer or a natural polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof. Binder fibers are generally selected to provide adhesiveness to the layer upon application of heat. That is, the binder fibers have a lower melting point that the staple fibers such that heating a blend of staple fibers and binder fibers above the melting point of the binder fiber but below the melting point of the staple fibers results in thermal bonding within the fiber blend to form a cohesive structure.

In one or more embodiments, the fiber layer can be formed from a mixture of polyester staple fibers and binder fibers including elastomeric binder fibers. In one or more embodiments, the density of the fiber layer can be in a range from about be 0.5 pounds per cubic foot (pcf) to about 10 pcf as measured in accordance with ASTM D 3574 A. In one or more other embodiments, the density of the fiber layer can be in a range from about 0.5 pcf to about 5 pcf, and in still one or more embodiments, the density of the fiber layer can be in a range from about 1.0 pcf to about 2.0 pcf.

The hardness properties of the fiber layer in the machine direction at 25% and at 65% can be within a range from about 10 to about 60 pounds-force and about 40 to about 120 pounds-force, respectively. In one or more embodiments, the hardness properties of the fiber layer in the machine direction at 25% and at 65% can be within a range from about 20 to about 40 pounds-force and about 50 to about 100 pounds-force, respectively; and in still one or more embodiments, the hardness properties of the fiber layer in the machine direction at 25% and at 65% can be within a range from about 25 to about 35 pounds-force and about 60 to about 80 pounds-force, respectively.

Other desirable properties for the fiber layer include tear strength within a range of about 500 to about 2000 N/m, a tensile strength of about 100 to about 300 kpa; elongation of about 60 to about 80%; and a compression set (50% at 120° F.) of less than about 20% at 24 hours.

The hybrid side rail assemblies generally have a thickness such that the top planar surface of the hybrid side rail assembly is coplanar to a top planar surface of an innercore assembly.

Turning now to FIGS. 2A-2J, there are shown perspective views of various hybrid side rail assembly 10 including one or more foam layers and one or more fiber layers at different thickness dimensions and similar width dimensions generally suitable for use with mattress assemblies. The particular dimensions are generally configured to provide the side rail assembly with an 8-inch height and a 3- or 4-inch width, which can be used to define a perimeter for mattress inner core having a height of about 8 inches. The dimensions are not intended to be limiting and are merely exemplary.

Figures 2A, 2B, 2C, 2D:
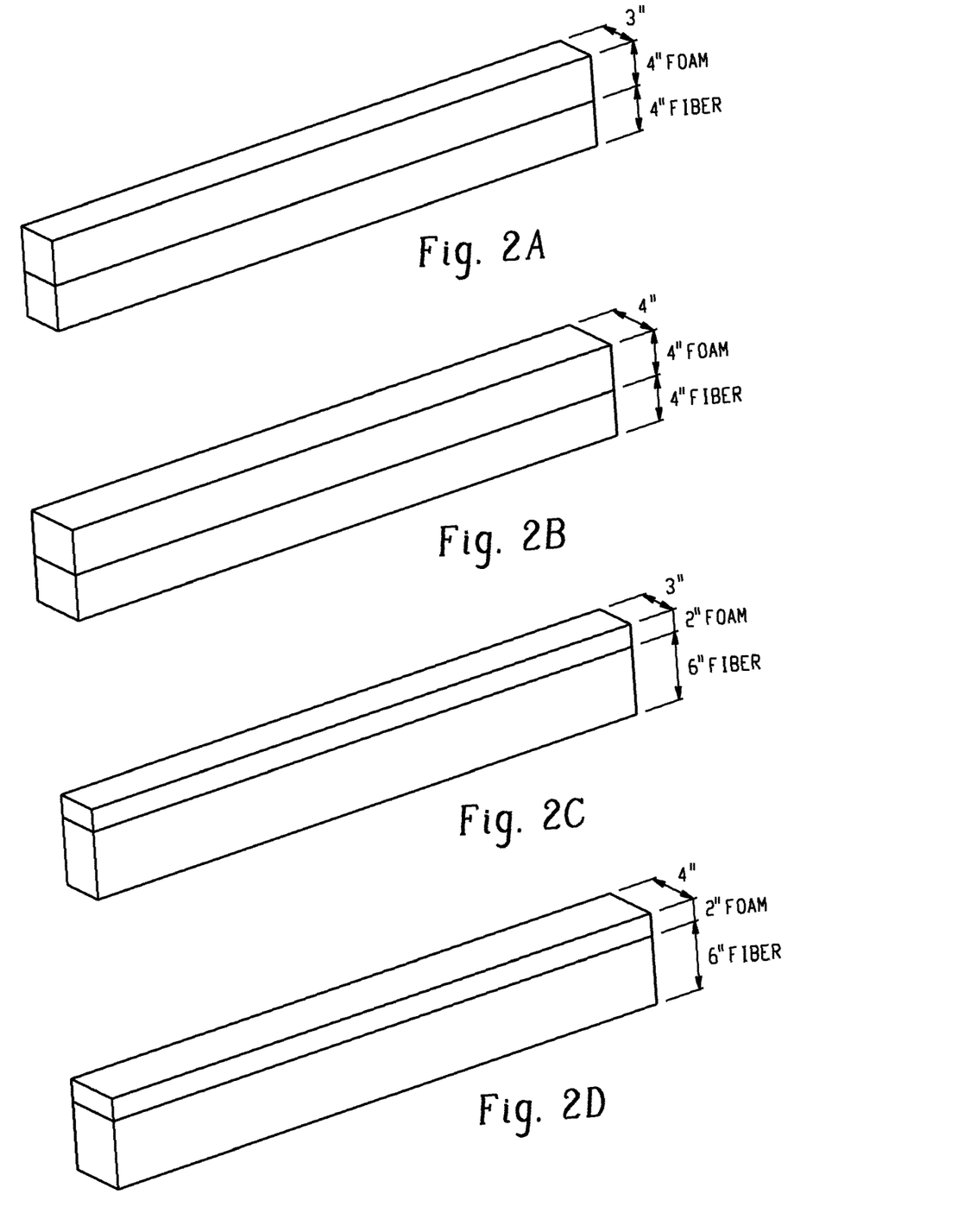
FIGS. 2A-2J illustrate perspective views showing portions of various hybrid side rail assemblies for a mattress assembly in accordance with an embodiment of the present disclosure.

FIG. 2A illustrates a perspective view of a hybrid side rail assembly including a single foam layer and a single fiber layer. Both the foam layer and the fiber layer can have a width dimension of about 3 inches and a height dimension of about 4 inches. The foam and fiber layers can be laminated to one another utilizing an adhesive.

FIG. 2B illustrates a perspective view of a hybrid side rail assembly including a single foam layer and a single fiber layer. Both the foam layer and the fiber layer can have a width dimension of about 4 inches and a height dimension of about 4 inches. The foam and fiber layers can be laminated to one another utilizing an adhesive.

FIG. 2C illustrates a perspective view of a hybrid side rail assembly including a single foam layer and a single fiber layer. In this hybrid side rail assembly, the foam layer has a height dimension of about 2 inches and the fiber layer has a height dimension of about 6 inches, wherein both the foam and fiber layers each have a width dimension of about 3 inches. The foam and fiber layers can be laminated to one another utilizing an adhesive.

FIG. 2D illustrates a perspective view of a hybrid side rail assembly including a single foam layer and a single fiber layer. In this hybrid side rail assembly, the foam layer has a height dimension of about 2 inches and the fiber layer has a height dimension of about 6 inches, wherein both the foam and fiber layers each have a width dimension of about 4 inches. The foam and fiber layers can be laminated to one another utilizing an adhesive.

Figures 2E, 2F:
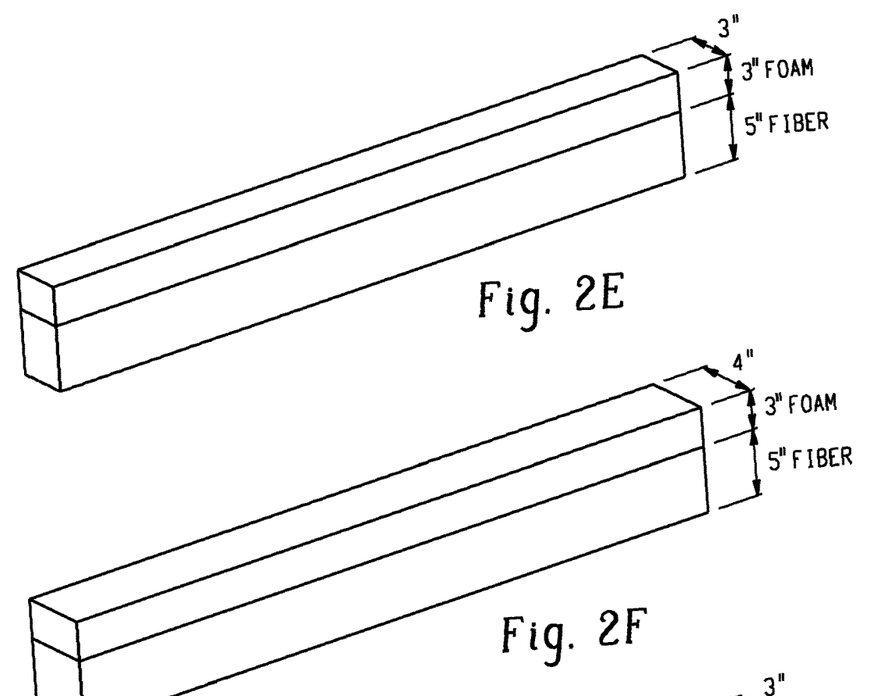

FIG. 2E illustrates a perspective view of a hybrid side rail assembly including a single foam layer and a single fiber layer. In this hybrid side rail assembly, the foam layer has a height dimension of about 3 inches and the fiber layer has a height dimension of about 5 inches, wherein both the foam and fiber layers each have a width dimension of about 3 inches. The foam and fiber layers can be laminated to one another utilizing an adhesive.

FIG. 2F illustrates a perspective view of a hybrid side rail assembly including a single foam layer and a single fiber layer. In this hybrid side rail assembly, the foam layer has a height dimension of about 3 inches and the fiber layer has a height dimension of about 5 inches, wherein both the foam and fiber layers each have a width dimension of about 4 inches. The foam and fiber layers can be laminated to one another utilizing an adhesive.

Figures 2G, 2H:
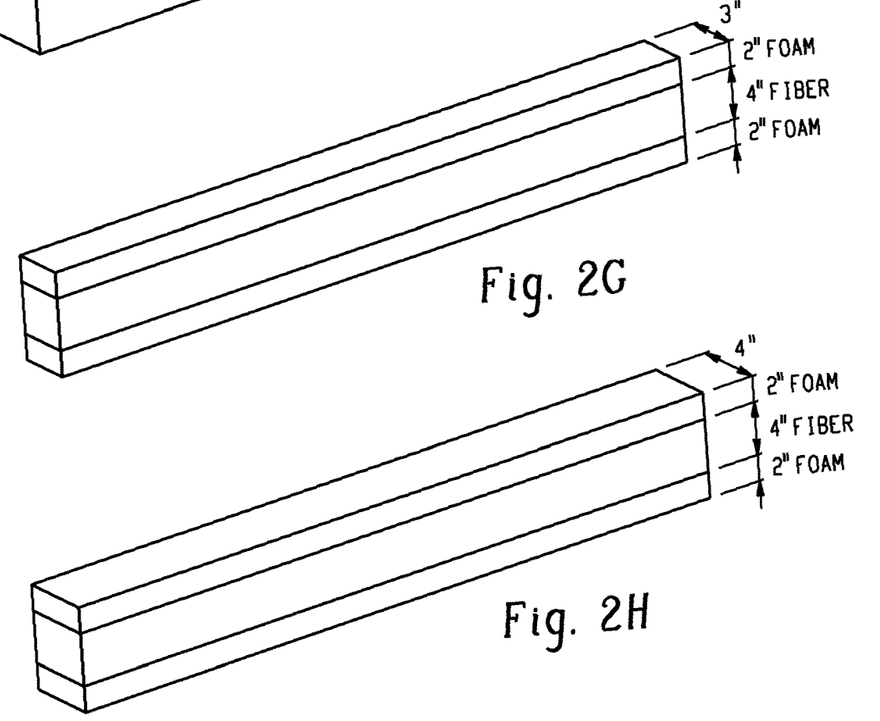

FIG. 2G illustrates a perspective view of a hybrid side rail assembly two foam layers and a single fiber layer intermediate the foam layers. In this hybrid side rail assembly, each foam layer has a height dimension of about 2 inches and the fiber layer has a height dimension of about 4 inches, wherein both the foam and fiber layers each have a width dimension of about 3 inches. The foam and fiber layers can be laminated to one another utilizing an adhesive.

FIG. 2H illustrates a perspective view of a hybrid side rail assembly two foam layers and a single fiber layer intermediate the foam layers. In this hybrid side rail assembly, each foam layer has a height o dimension f about 2 inches and the fiber layer has a height dimension of about 4 inches, wherein both the foam and fiber layers each have a width dimension of about 4 inches. The foam and fiber layers can be laminated to one another utilizing an adhesive.

Figure 2I:
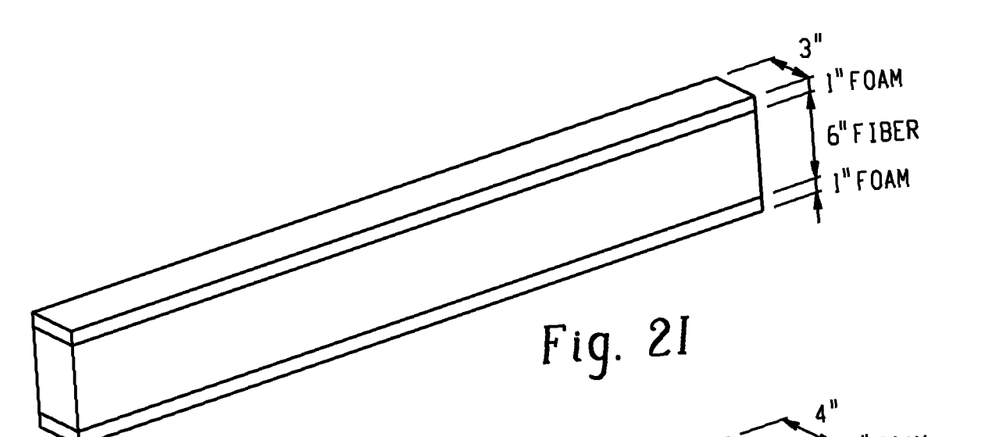

FIG. 2I illustrates a perspective view of a hybrid side rail assembly two foam layers and a single fiber layer intermediate the foam layers. In this hybrid side rail assembly, each foam layer has a height dimension of about 1 inch and the fiber layer has a height dimension of about 6 inches, wherein both the foam and fiber layers each have a width dimension of about 3 inches. The foam and fiber layers can be laminated to one another utilizing an adhesive.

Figure 2J:
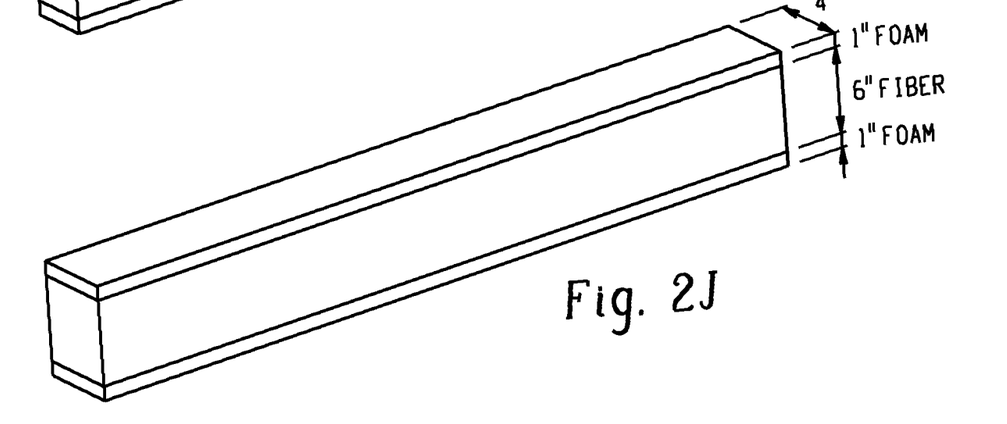

FIG. 2J illustrates a perspective view of a hybrid side rail assembly two foam layers and a single fiber layer intermediate the foam layers. In this hybrid side rail assembly, each foam layer has a height dimension of about 1 inch and the fiber layer has a height dimension of about 6 inches, wherein both the foam and fiber layers each have a width dimension of about 4 inches. The foam and fiber layers can be laminated to one another utilizing an adhesive.

Although reference has been made to the use of adhesives for laminating the layers within the hybrid side rail assembly, other methods for forming the laminated structure can include application of heat and pressure as well as the use of mechanical fasteners. For example, the foam layer and/or the fiber layers can be heated to a temperature effective to soften and melt a portion of the fiber layer, which can then be laminated to one another under pressure such as by passing the stackedly arranged layers through pressure rollers.

The side rails may be attached or placed adjacent to at least a portion of the perimeter of the mattress inner core. In certain embodiments, the side rails have a firmness greater than that provided by the stacked mattress layers defining the inner core. The side rails may be fastened to the inner core via adhesives, thermal bonding, or mechanical fasteners.

For ease in manufacturing the mattress assembly, the foam side rail assembly may be assembled in linear sections such as that shown in FIGS. 2A-2J that are joined to one another to form the desired perimeter about the mattress inner core. An optional fabric layer (not shown) can be disposed about the perimeter of the side rail, i.e., serves as a mattress border. The fabric border layer is attached at one end to the top planar surface of the uppermost mattress layer and at the other end to the bottom planar surface of the bottom most layer.

The mattress assemblies described herein may further include additional layers and the embodiments described herein are not intended to be limited with respect to number, type, or arrangement of layers in the mattress and side rail assembly.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mattress assembly, comprising:
   an inner core having opposing major surfaces defining a height therebetween; and
   a side rail assembly disposed about at least a portion of a perimeter of the inner core for supporting an edge thereof, wherein the side rail assembly comprises a laminate structure consisting of one or more foam layers and one or more fiber layers in a vertically stacked arrangement such that the one or more foam layers and the one or more fiber layers overlay one another, the vertical stacking being along the height of the inner core,
   wherein the one or more foam layers have a hardness property of an indention load/force deflection (ILD/IFD) of about 35 pounds-force to about 100 pounds-force and a density of about 1 pound per cubic foot to about 3 pounds per cubic foot, and
   wherein the one or more fiber layers have a hardness property of about 10 pounds-force to about 60 pounds-force in a machine direction at 25% and a density of about 0.5 pounds per cubic foot to about 10 pounds per cubic foot.

2. The mattress assembly of claim 1, wherein the side rail assembly has a hardness greater than the mattress inner core.

3. The mattress assembly of claim 1, wherein the side rail assembly has a planar top surface defined by the one or more foam layers.

4. The mattress assembly of claim 1, wherein the side rail assembly has a planar top surface coplanar to a top major surface of the inner core.

5. The mattress assembly of claim 1, wherein the one or more foam layers comprises a foam layer having an open cell structure.

6. The mattress assembly of claim 1, wherein the inner core comprises foam, coils, air bladders or a combination thereof.

7. The mattress assembly of claim 1, wherein the one or more foam layers comprises a polyurethane foam and the one or more fiber layers comprises a non-woven layer comprising polyester staple fibers and elastomeric binder fibers.

8. The mattress assembly of claim 1, wherein the one or more fiber layers have a hardness property of about 50 pounds-force to 100 pounds-force in the machine direction at 65%, and at least one of the following properties:
   a tensile strength of about 100 to about 300 kPa,
   an elongation of about 60 to 80%, and
   a compression set (50% at 120° F.) of less than about 20% at 24 hours.

9. The mattress assembly of claim 1, wherein the one or more foam layers comprises more than one foam layer having one or more different properties.

10. The mattress assembly of claim 1, wherein the one or more foam layers comprises a channel therethrough configured for air flow.

11. The mattress assembly of claim 1, wherein the perimeter of the inner core comprises a foot end and a head end connected by lateral sides, wherein the side rail assembly is disposed about the perimeter of the inner core in one of the following arrangements:
    at the lateral sides,
    at the lateral sides and the foot end, or
    at the lateral sides, the foot end, and the head end.

12. A side rail assembly configured for supporting an edge of an inner core of a mattress, the inner core having opposing major surfaces defining a height therebetween, the side rail assembly comprising:
    a laminate structure consisting of one or more foam layers and one or more fiber layers in a vertically stacked arrangement such that the one or more foam layers and the one or more fiber layers overlay one another, the vertical stacking configured to be along the height of the inner core,
    wherein the one or more foam layers have a hardness property of an indention load/force deflection (ILD/IFD) of about 35 pounds-force to about 100 pounds-force and a density of about 1 pound per cubic foot to about 3 pounds per cubic foot, and
    wherein the one or more fiber layers have a hardness property of about 10 pounds-force to about 60 pounds-force in a machine direction at 25% and a density of about 0.5 pounds per cubic foot to about 10 pounds per cubic foot.

13. The side rail assembly of claim 12, wherein the hardness property of the one or more foam layers is an ILD/IFD of about 50 pounds-force to about 75 pounds-force and the density of the one or more foam layers is about 1.2 pounds per cubic foot to about 2 pounds per cubic foot, and
    wherein the hardness property of the one or more fiber layers is about 25 to 35 pounds-force in the machine direction at 25% and is about 60 to 80 pounds-force in the machine direction at 65%, and the density of the one or more fiber layers being about 1 pound per cubic foot to about 2 pounds per cubic foot.

14. The side rail assembly of claim 12, wherein the laminate structure has a parallelpiped shape.

15. The side rail assembly of claim 12, wherein the one or more foam layers comprises a polyurethane foam and the one or more fiber layers comprises a non-woven layer comprising polyester staple fibers and elastomeric binder fibers.

16. The side rail assembly of claim 12, wherein the one or more fiber layers have a hardness property of about 50 pounds-force to 100 pounds-force in the machine direction at 65%, and at least one of the following properties:
    a tensile strength of about 100 to about 300 kPa,
    an elongation of about 60 to 80%, and
    a compression set (50% at 120° F.) of less than about 20% at 24 hours.

17. The side rail assembly of claim 12, wherein the one or more foam layers comprises more than one foam layer having one or more different properties.

18. The side rail assembly of claim 17, wherein the one or more different properties of the more than one foam layer comprise(s) density, hardness, thickness, support factor, flex fatigue, air flow, or combinations thereof.

19. The side rail assembly of claim 12, wherein the laminate structure includes an uppermost foam layer.

20. The side rail assembly of claim 12, wherein the laminate structure includes an uppermost foam layer, a bottommost foam layer and a non-woven fiber layer intermediate the uppermost and bottommost foam layers.

\* \* \* \* \*